United States Patent [19]

Copley et al.

[11] 3,844,728

[45] Oct. 29, 1974

[54] GAS CONTACTING ELEMENT LEADING EDGE AND TRAILING EDGE INSERT

[75] Inventors: Stephen M. Copley, Madison; Anthony F. Giamei, Middletown; Merton F. Hornbecker, Woodbury; Bernard H. Kear, Madison, all of Conn.

[73] Assignee: United Aircraft Corporation, East Hartford, Conn.

[22] Filed: June 22, 1970

[21] Appl. No.: 48,228

Related U.S. Application Data

[63] Continuation-in-part of Ser. No. 714,737, March 20, 1968, abandoned.

[52] U.S. Cl. .............................. 29/191.6, 164/108
[51] Int. Cl. ...................... B32b 15/02, B22d 19/00
[58] Field of Search ........ 29/183, 183.5, 193, 191.6

[56] References Cited

UNITED STATES PATENTS

| 3,098,723 | 7/1963 | Micks | 29/183.5 |
| 3,215,511 | 11/1965 | Chisholm et al. | 29/183 |
| 3,427,185 | 2/1969 | Cheatham et al. | 29/191.6 X |

*Primary Examiner*—A. B. Curtis
*Attorney, Agent, or Firm*—Charles A. Warren

[57] ABSTRACT

A leading edge or trailing edge insert for use with a gas contacting blade or vane. The insert is a macrocomposite structure of metal and refractory material wherein wires in single crystal form pass through the refractory material and prestress the refractory material in compression.

9 Claims, 3 Drawing Figures

PATENTED OCT 29 1974　　3,844,728

INVENTORS
BERNARD H. KEAR
MERTON F. HORNBECKER
STEPHEN M. COPLEY
ANTHONY F. GIAMEI

BY Charles P Warren
ATTORNEY

GAS CONTACTING ELEMENT LEADING EDGE AND TRAILING EDGE INSERT

This is a continuation in part of copending application Ser. No. 714,737 filed Mar. 20, 1968 having the same inventors as this application and now abandoned.

BACKGROUND OF THE INVENTION

This invention relates to a gas contacting element structure, the leading edge and trailing edge of which have exceptional high temperature strength and corrosion/erosion properties.

The use of metal refractory composites has long been recognized as offering special advantages as structural materials for high temperature applications. These composite structures have particular application and provide distinct advantages particularly in the operation of gas turbine engines and the like. In a gas turbine engine the gas contacting elements of the engine are continuously subjected to a very severe and complex environment, such as high temperatures, severe thermal gradients, erosion, and forces which tend to deform the gas contacting elements. These forces have a particularly adverse effect on the leading and trailing edges of these gas contacting elements. As a result of the severe temperature gradients and other thermal conditions encountered by the gas contacting elements presently employed in gas turbine engines, the permissible operational periods and operating temperature of these gas contacting elements are limited considerably.

As hereinbefore noted, composite structures are known in the art, the composite structure described in U.S. Pat. No. 3,215,511, being a typical example of these structures. The composite structure described therein and the structures described in similar prior art generally employ a structure wherein a ceramic or other material is used in conjunction with a high temperature alloy. The composition of the structure is such that the high temperature alloy is the predominant constituent rather than the ceramic or other material. While this structure is somewhat of an improvement over the metal structures generally used, it is still not the ideal in that the permissible operational periods and operational temperatures of the structure are still limited, the controlling factor being the metal alloy and its properties.

The prior art also discloses composite structures which have application and use in the field of construction, for example, prestressed concrete. While there is some similarity between these structures in the present invention, these former structures are not capable of use in high temperature applications, nor do they have the characteristics of providing high temperature creep strength and resistance to oxidation, sulfidation, and erosion, particularly on the leading and trailing edges of a gas contacting elements.

SUMMARY OF THE INVENTION

The primary object of this invention is to provide a gas contacting element structure which has high temperature creep strength, is resistant to oxidation, sulfidation, and erosion, and has favorable impact loading characteristics at the leading and trailing edges of the gas contacting elements.

The structure of the present invention is one which is comprised of a central main body of a high temperature alloy, and a leading edge insert engageably connected to the central body. This leading edge insert consists of a refractory material, preferably a ceramic, with a plurality of metal wires extending therethrough, the wires being preferably of a nickel or cobalt base alloy, and terminating at opposite ends of the insert in integral shroud elements forming part of the central body. Additionally, a trailing edge insert of substantially the same construction may be engageably attached to the central main body, thus providing a gas contacting element of this construction having improved properties at its most vulnerable points.

The process or method for producing turbine vanes having a macrocomposite structure is disclosed in a copending application, Ser. No. 45,687, entitled MACROCOMPOSITE STRUCTURE AND PROCESS THEREFOR by Stephen M. Copley et al. filed June 12, 1970. As described in this application, the ceramic or refractory material has a different rate of thermal contraction than the single crystal metal wires, and as a result, during the cooling process of the melt, the refractory material is prestressed in compression. In the structure of the present invention, the primary function of the metal wires is load distribution and protection of the refractory material from catastrophic failure by thermal shock, or impact loading at low temperatures, while the primary function of the refractory of ceramic material is to provide high temperature creep strength and resistance to oxidation, sulfidation, and erosion.

Another feature of the present invention is that there is no bonding between the metal and the refractory mass, the refractory mass being held in place by the columnar grain structure which is integral with the central body and which is maintained at the top and bottom of the leading and trailing edge inserts on removing the gas contacting element from the casting mold. These end elements forming part of the vane shrouds are integral with the central body of the vane. This latter portion of the gas contacting element structure, that is, the cube oriented columnar section at the bottom and top of the leading and trailing edges, also provides a secondary effect in that it maintains the beneficial compressive stress formed in the refractory mass, in a positive manner.

The positioning and the numbers of the longitudinal holes contained in the refractory mass are also of significance in the leading and trailing edge inserts. In certain instances, it would be desirable to have an inhomogeneous distribution of single crystal metal wires within the refractory mass, this thereby providing the correct number of wires for any desired stress distribution and stress level. Near the outer surface a uniformly high level of compressive stress is required to retard crack initiation and growth in a refractory mass, and therefore ideally, the single crystal wires should be very fine and closely spaced. There are limitations on wire size and inter-wire spacing imposed on both the metal casting and the refractory mass forming processes. The main limitation on this type construction is that the component must be designed to have no bending moments. This is accomplished by maintaining a relatively constant volume fraction of metal from the leading to the trailing edges. Similarly, there are applications of the present invention where it would be desirable to have a homogeneous distribution of single crystal wires within the refractory mass. This type configuration provides distinct advantages in that the level of compressive stress on a refractory mass and the main body portion would be relatively high even at operating temperatures. Stress relief within the single crystal metal wires would occur at much lower rates due to the higher creep resistance at lower metal temperatures.

DESCRIPTION OF THE PREFERRED EMBODIMENT

Figure 1:
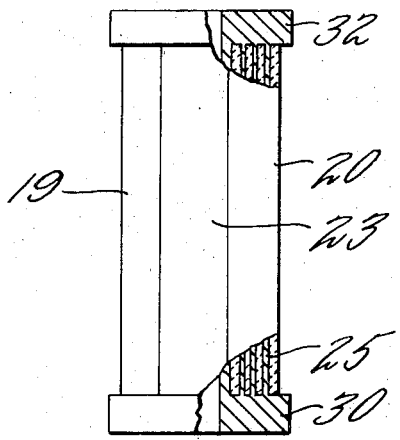
FIG. 1 is an elevation of a finished vane with parts broken away.
Figure 2:
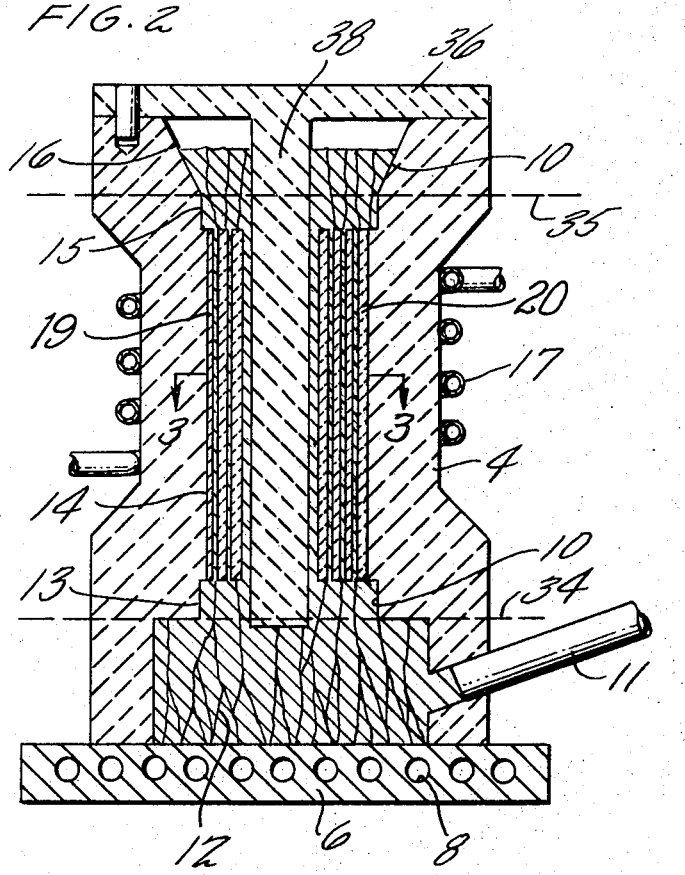
FIG. 2 is a vertical section of a preferred mold construction for use in producing the device of the present invention.

Referring now to the drawings in detail, a preferred form of mold geometry is illustrated in FIG. 2. The mold construction described herein is particularly suited for use with any of the so-called superalloys as described, for example, in the VerSnyder U.S. Pat. No. 3,260,505. As therein noted, these alloys are generally adapted for the process known as directional solidification, the most preferred alloy being a nickel base or a cobalt base alloy. The mold construction herein described, in addition to the disclosure contained in the VerSnyder patent, employs the technique of forming Monocrystaloys$_{TM}$ as described in the Piearcey U.S. Pat. No. 3,494,709.

As herein illustrated, one end of a tubular mold 4 compatible with the procedure described in the VerSnyder patent, is placed on a relatively cool heat conductive and preferably water-cooled chill plate 6. Water for cooling the chill plate flows through passages 8. Tubular mold 4 is preferably made from a ceramic material from a conventional slurry of alumina or other high melting point refractory material in accordance with standard molding techniques. One end of the tube 4 rests on the chill plate 6 and cooperates to define an inclused cavity 10 extending vertically through the mold. In communication with cavity 10 is a passageway 11 through which molten metal is fed to the cavity.

The cavity 10 within the mold includes a growth zone 12 directly above the chill plate, an inner shroud forming portion 13 above the growth zone and then the vane forming portion 14, generally of airfoil shape. At the top end of portion 14 the cavity has the outer shroud forming portion 15 with the riser portion 16 above it.

Surrounding the mold are the means for heating the mold to the desired temperature for casting. Preferably the mold is surrounded by an electrical resistance heating coil 17 supplied with variable electrical energy. Alternatively, the mold is surrounded by a graphite susceptor, not shown, and this in turn is surrounded by an induction coil supplied by high frequency electrical current as is usual in an induction furnace. Prior to casting, the mold is heated to the desired temperature by supplying energy to coil 17 and when the desired temperature has been attained, molten metal heated to the proper temperature for casting is poured into cavity 10. The chill plate 6 is maintained at a relatively cool temperature so as to establish a temperature gradient within the molten metal filling cavity 10 as the metal solidifies.

Ceramic leading and trailing edge inserts 19 and 20 are positioned in the vane forming portion 14 of the cavity 10. The inserts 19 and 20 have dovetail shaped tongues 21 and 22 to be embedded in the cast metal of the central portion 23 of the finished vane to provide a support for these inserts. These inserts also have a plurality of parallel longitudinally extending openings 24 which are filled with the metallic alloy when the casting is made to form metallic wires or rods 25 extending the entire length of the insert.

The inserts 19 and 20 have excellent heat resistant characteristics and are able to withstand temperatures up to 1,900°F. It has been found that an ideal refractory mass would be a ceramic such as an alumina base material.

The completed vane includes the central body portion 23, the leading and trailing edge inserts 19 and 20, inner and outer end shrouds 30 and 32 formed in the appropriately shaped portions 13 and 15 of the mold cavity 10 and the interconnecting wires or rods 25 in the passages 24 in the inserts 19 and 20. When the casting is complete the usable vane is severed from the bottom and top ends of the complete cast structure approximately along lines 34 and 35 respectively.

Prior to pouring alloy into the mold a cap 36 may be mounted in the top end of the mold and this cap has a depending projection or core 38 that extends downwardly centrally through the cavity 10 to a point at least below the lower edge of the shroud forming portion 13 of the cavity. This cap and projection are preferably of an appropriate core material which will define the location of the air cooling passage.

When the mold is ready for use and has been heated by the coil 17 to a temperature above the melting temperature of the alloy, the mold is filled with the molten alloy at least into the riser portion 16 of the cavity 10. Thus the molten alloy fills the growth zone 12, the shroud portions 13 and 15, the vane forming portion 14 and at least a part of the riser. The molten alloy also fills the passages 24 in the inserts. After the mold is filled solidification begins at the chill plate and columnar grain growth forms in the growth zone as shown and described in VerSnyder U.S. Pat. No. 3,260,505 or Sink U.S. Pat. No. 3,417,809. Toward the upper end of the growth zone these grains all become substantially parallel vertical grains that continue upwardly through the shroud forming portion 13 and through the central portion of the vane around the projection 38. This columnar grain growth also occurs in the outer shroud 33. The columnar grain growth is established by the proper thermal gradient within the mold and by the rate of upward movement of the liquid-solid interface as the metal solidifies. The technique for accomplishing this is described in the above-identified VerSnyder patent.

The alloy in the passages 24 becomes a single crystal since the size of the passages is such as to select a single crystal from the columnar grain growth directly below these passages. Alternatively the passages 24 may be somewhat larger than would select a single crystal in which event a restriction may be provided between the base portion 30 and the chill plate 6. This construction is not shown.

Therefore as the molten metal solidifies from the chill plate upwardly it has a controlled columnar-grain structure up to the lower ends of the passages 24 and therefore forms a columnar-grain structure with the grains extending vertically in the shroud portion 13 and this columnar-grain structure continues upwardly through the vane forming portion 14 and in the top shroud portion 15. As the solidification begins in the passages 24 this structure is a single crystal extending integrally upward from the lower shroud portion and this single crystal propagates through these passages to the upper shroud portion where these single crystals combine again into a columnar-grain structure with the grains again extending vertically and therefore in parallel relation to the continued columnar growth upwardly from the vane forming portion 14.

The resulting structure is accordingly a metallic unitary structure with the single crystal rods 25 integral with the portions of the top and bottom shrouds that extend over the ends of the refractory inserts.

Once the casting process has produced the columnar grain and single crystal structure above described, the alloy continues to cool and by reason of the thermal contraction as the material cools the ceramic or refractory inserts 19 and 20 are prestressed in compression because of the fact that the refractory inserts have a smaller thermal contraction rate than that of the crystalline structure of the metallic part of the vane. The effect is to produce a small tensile load on the vane and on the wire rods but a substantial compressive stress on the inserts. This compressive stress is particularly beneficial in that it inhibits crack nucleation in the inserts, it aids in rehealing of incipient cracks at the elevated operating temperatures of the vane and it further reduces continued propagation of cracks in operation. More specifically, base portion or shroud 30 has the same cube oriented columnar-grain structure as the top portion or upper shroud 32, interconnected by an intermediate structure of single crystal wires or rods 25 and the columnar-grained central portion 23.

Figure 3:
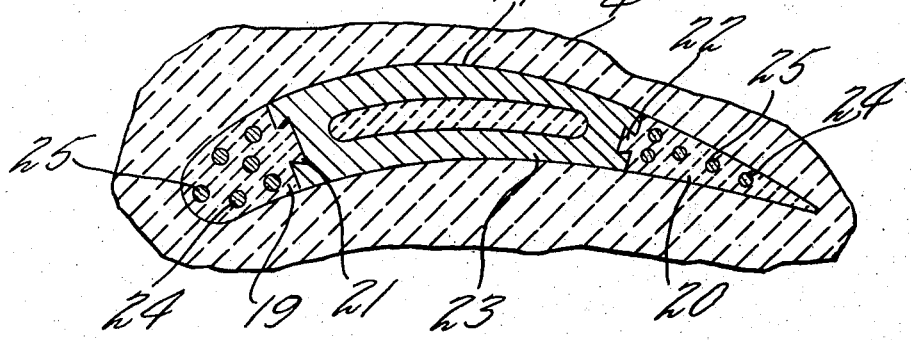
FIG. 3 is a schematic top section substantially along line 3—3 of FIG. 2 illustrating a leading and trailing edge construction with homogeneously distributed single crystal metal wires.

It is pointed out that the single crystal wires 25 within the refractory inserts may be positioned homogeneously or inhomogeneously within the inserts, this being a function of how the longitudinal openings 24 are positioned within the refractory mass. The leading edge insert, as shown in FIG. 3, illustrates a relatively homogeneous distribution of the wires within the refractory mass, while the trailing edge insert illustrates an inhomogeneous distribution of the wires within the trailing edge insert.

In the preferred embodiment of the present invention it is desirable that each of the inserts comprise a continuous structure at the leading edge and at the trailing edge insert structure. More specifically, each insert in the embodiment illustrated herein is a one piece construction of alumina. The constituents of a preferred leading edge or trailing edge structure are illustrated by the following example:

EXAMPLE I

A macrocomposite structure wherein the refractory inserts are made of 99 percent alumina (McDanel AP 35, McDanel Refractory Porcelain Co., Beaver Falls, Penna.) and the single crystal wires passing through longitudinal openings within the inserts and the remainder of the metallic parts of the vane are the nickel base superalloy Mar-M-200 (0.15 C, 9 Cr, 10 Co, 2Ti, 5 Al, 12.5W, 1.0 Cb, 0.05 Zr, 0.015 B, 1.5 Fe, Bal. Ni). Longitudinal holes of 0.030 inch diameter, are spaced in a hexagonally arranged close packed array within the refractory leading edge inlet. With a center-to-center spacing of holes equal to 0.053 inch, the refractory insert will contain 30 volume percent of single crystal wires after casting. The stress in the refractory and the wires are:

$$\sigma_{33} = - [(V_2 \widetilde{E}_1 \widetilde{E}_2)/(\widetilde{E}_1 V_1 + \widetilde{E}_2 V_2)] \widetilde{\Delta} \alpha \Delta T, \quad (1)$$

and $$\sigma_{33} = [(V_1 \widetilde{E}_1 \widetilde{E}_2)/(\widetilde{E}_1 V_1 + \widetilde{E}_2 V_2)] \widetilde{\Delta} \alpha \Delta T, \quad (2)$$

respectively, where
$\widetilde{E}_1$ = Average Young's modulus of alumina
$\widetilde{E}_2$ = Average Young's modulus of Mar-M-200
$V_1$ = Volume fraction alumina
$V_2$ = Volume fraction Mar-M-200 wires
$\widetilde{\Delta} \alpha = \widetilde{\alpha}_1 - \widetilde{\alpha}_2$
$\widetilde{\alpha}_1$ = Average linear thermal expansion coefficient of alumina
$\widetilde{\alpha}_2$ = Average linear thermal expansion coefficient of Mar-M-200
$-\Delta T$ = Operational temperature - ambient temperature.

It is assumed that the stress in the ceramic and the metal is zero at the operational temperature.

Taking $\widetilde{E}_1 = 50 \times 10^6$ psi, $\widetilde{E}_2 = 16 \times 10^6$ psi, $V_1 = 70$ v/o, $V_2 = 30$ v/o, $\widetilde{\alpha}_1 = 4.3 \times 10^{-6}$°F, $\widetilde{\alpha}_2 = 7.2 \times 10^{-6}$°F, and $-\Delta T = 1,800$°F, $$-\sigma_{33} = 32,400 \text{ psi} \quad (1)$$

$$\sigma_{33} = 73,800 \text{ psi} \quad (2)$$

are the stresses calculated in the ceramic and metal wires respectively.

It is to be understood that the invention is not limited to the embodiments herein illustrated and described but may be used in other ways without departure from the spirit as defined by the following claims.

We claim:

1. A gas contacting element such as a turbine vane including
    a metallic central body member,
    a non-metallic leading edge insert extending the length of said body member, and having a plurality of parallel longitudinal passages therein each extending the entire length of said insert,
    a shroud element at each end of and integral with the body member, each of said shroud elements extending over the ends of said insert, and
    metallic rods integral with said shroud elements and extending through said longitudinal passages.

2. A gas contacting element as in claim 1 in which said shroud elements and central body member are a columnar-grained metallic structure with the grains parallel to the longitudinal axis of the body member.

3. A gas contacting element as in claim 1 in which the metallic rods are a single crystal from end to end.

4. A gas contacting element as in claim 2 in which the metallic rods are a single crystal from end to end.

5. A cast gas contacting element including
    spaced metallic shroud elements,
    an airfoil-shaped member having leading and trailing edges extending between said shroud elements, said member being essentially metallic and integral with said shroud elements, a non-metallic refractory insert forming a part of the airfoil member at one of said edges, and having a plurality of parallel passages therein, said insert extending between and into contact with the shrouds, and metallic rods in said passages in the insert and extending into and being integral with said shrouds, the insert having a lower rate of thermal contraction than said rods thereby to be stressed in compression when the element is cooled.

6. A cast gas contacting element as in claim 5 in which the insert is at the leading edge.

7. A cast gas contacting element as in claim 5 in which there is a non-metallic refractory insert at each of the leading and trailing edges.

8. A gas contacting element including
a metallic central body member,
a non-metallic insert engaging with said body member and extending parallel thereto to form an extension of the surface of said body member said insert having at least one longitudinal passage therethrough, shroud elements integral with said central member at opposite ends thereof, said elements extending over and in contact with opposite ends of said insert, and a metallic rod extending through said passage and terminating in said shroud elements, said rods being integral with said shroud elements.

9. A gas contacting element as in claim 8 in which the rod is a single crystal and the body member and shroud elements are columnar grained.

* * * * *